(12) United States Patent
Tun et al.

(10) Patent No.: US 11,344,053 B2
(45) Date of Patent: May 31, 2022

(54) ASSISTING APPARATUS FOR BEAN ROASTING AND BEAN ROASTING APPARATUS

(71) Applicant: JIYONSON CO., LTD., New Taipei (TW)

(72) Inventors: Yun-Long Tun, New Taipei (TW); Chia-Yen Liu, New Taipei (TW); Yi-Chi Lin, New Taipei (TW)

(73) Assignee: JIYONSON CO., LTD., New Taipei (TW)

( * ) Notice: Subject to any disclaimer, the term of this patent is extended or adjusted under 35 U.S.C. 154(b) by 599 days.

(21) Appl. No.: 16/194,118

(22) Filed: Nov. 16, 2018

(65) Prior Publication Data

US 2019/0142054 A1 May 16, 2019

Related U.S. Application Data

(60) Provisional application No. 62/587,448, filed on Nov. 16, 2017.

(51) Int. Cl.
*A23N 12/12* (2006.01)
*H04R 1/08* (2006.01)
(Continued)

(52) U.S. Cl.
CPC .............. *A23N 12/125* (2013.01); *A23F 5/04* (2013.01); *A23N 12/08* (2013.01); *G05B 15/02* (2013.01);
(Continued)

(58) Field of Classification Search
CPC ........ A23N 12/125; A23N 12/08; G06T 7/90; A23F 5/04; G05B 15/02; G06K 9/6212;
(Continued)

(56) References Cited

U.S. PATENT DOCUMENTS 4,325,191 A * 4/1982 Kumagai ............... A23N 12/12
34/571
4,494,314 A * 1/1985 Gell, Jr. ................. A23N 12/08
219/502
(Continued)

FOREIGN PATENT DOCUMENTS

CN 1712913 A 12/2005
JP 2003265154 A 9/2003
(Continued)

OTHER PUBLICATIONS

Office Action to the corresponding Chinese Patent Application rendered by the China National Intellectual Property Administration (CNIPA) dated Dec. 1, 2020, 16 pages (including English translation).
(Continued)

*Primary Examiner* — Jimmy Chou
(74) *Attorney, Agent, or Firm* — Skaar Ulbrich Macari, P.A.

(57) ABSTRACT

An assisting apparatus for bean roasting and a bean roasting apparatus are provided. The present invention senses sound in a chamber of a bean roasting device through a microphone to generate an audio signal, and control the bean roasting procedure by determining that the energy value of the audio signal crosses a threshold at a time point based on the observation time window.

16 Claims, 9 Drawing Sheets

(51) Int. Cl.
  *A23F 5/04* (2006.01)
  *G10L 25/51* (2013.01)
  *G10L 25/21* (2013.01)
  *H04R 1/02* (2006.01)
  *A23N 12/08* (2006.01)
  *G06V 10/75* (2022.01)
  *G06T 7/90* (2017.01)
  *G05B 15/02* (2006.01)
  *G06V 10/25* (2022.01)
  *G06V 20/68* (2022.01)

(52) U.S. Cl.
  CPC .............. *G06T 7/90* (2017.01); *G06V 10/758* (2022.01); *G10L 25/21* (2013.01); *G10L 25/51* (2013.01); *H04R 1/028* (2013.01); *H04R 1/08* (2013.01); *G06V 10/25* (2022.01); *G06V 10/759* (2022.01); *G06V 20/68* (2022.01)

(58) Field of Classification Search
  CPC ......... G06K 9/3233; G06K 2009/6213; G06K 2209/17; G10L 25/21; G10L 25/51; H04R 1/028; H04R 1/08
  USPC ........................................................ 99/332
  See application file for complete search history.

(56) References Cited

U.S. PATENT DOCUMENTS

| | | | | |
|---|---|---|---|---|
| 4,602,147 A * | 7/1986 | Gell | ................ | A23N 12/08 219/497 |
| 5,076,157 A * | 12/1991 | Satake | ................ | A23N 15/06 99/519 |
| 5,359,788 A * | 11/1994 | Gell, Jr. | ................ | A23N 12/083 219/502 |
| 5,387,256 A * | 2/1995 | Enomoto | ................ | A47J 31/42 34/233 |
| 5,500,237 A * | 3/1996 | Gell, Jr. | ................ | A23F 5/046 34/360 |
| 5,960,561 A * | 10/1999 | Parodi | ................ | A23N 12/08 34/218 |
| 6,260,479 B1 * | 7/2001 | Friedrich | ................ | A23N 12/08 34/594 |
| 6,679,163 B1 * | 1/2004 | Su | ................ | A23N 12/08 99/339 |
| 7,143,686 B1 * | 12/2006 | Sandolo | ................ | A23F 5/04 99/286 |
| 7,455,867 B1 * | 11/2008 | Gutwein | ................ | A47J 31/002 426/594 |
| 9,386,798 B2 * | 7/2016 | Sewell | ................ | A23N 12/083 |
| 10,039,307 B2 * | 8/2018 | Wilson | ................ | A23N 12/125 |
| 10,517,313 B2 * | 12/2019 | Tan | ................ | G01N 21/00 |
| 2003/0023444 A1 * | 1/2003 | St. John | ................ | H04M 3/382 704/270.1 |
| 2003/0095673 A1 * | 5/2003 | Colmenarez | ................ | G10L 15/22 381/110 |
| 2004/0074400 A1 * | 4/2004 | Song | ................ | A23N 12/10 99/483 |
| 2005/0128484 A1 * | 6/2005 | Rodrigues | ................ | G06T 11/001 356/402 |
| 2007/0221668 A1 * | 9/2007 | Baarman | ................ | H02J 50/80 219/746 |
| 2008/0089986 A1 * | 4/2008 | Song | ................ | A23N 12/125 426/466 |
| 2008/0134907 A1 * | 6/2008 | Iiyama | ................ | A23N 12/08 99/467 |
| 2009/0220645 A1 * | 9/2009 | Martinez | ................ | A23F 5/02 426/45 |
| 2010/0051602 A1 * | 3/2010 | Beardsley | ................ | A23N 12/083 219/429 |
| 2011/0253693 A1 * | 10/2011 | Lyons | ................ | F24C 15/2021 219/209 |
| 2012/0265364 A1 * | 10/2012 | Zambrano | ................ | A23N 12/08 700/300 |
| 2013/0186887 A1 * | 7/2013 | Hallgren | ................ | H05B 6/68 219/702 |
| 2013/0202748 A1 * | 8/2013 | Fountain | ................ | B65D 85/8043 426/115 |
| 2013/0302483 A1 * | 11/2013 | Riefenstein | ................ | G06T 7/001 426/233 |
| 2013/0344207 A1 * | 12/2013 | Ludwig | ................ | A23F 5/046 426/233 |
| 2014/0076167 A1 * | 3/2014 | Boggavarapu | ................ | A47J 31/42 99/286 |
| 2014/0146976 A1 * | 5/2014 | Rundle | ................ | H04R 1/1083 381/71.6 |
| 2014/0203012 A1 * | 7/2014 | Corona | ................ | H05B 6/6447 219/705 |
| 2014/0242239 A1 * | 8/2014 | Boggavarapu | ................ | A47J 31/3633 426/433 |
| 2014/0370181 A1 * | 12/2014 | Young | ................ | A23F 5/12 426/595 |
| 2015/0201796 A1 * | 7/2015 | Kuempel | ................ | H04L 67/10 426/231 |
| 2015/0330640 A1 * | 11/2015 | Wersborg | ................ | F24C 7/08 99/332 |
| 2016/0066744 A1 * | 3/2016 | Baxi | ................ | A47J 36/321 99/343 |
| 2016/0097711 A1 * | 4/2016 | Wang | ................ | G01N 21/27 250/206 |
| 2016/0120211 A1 * | 5/2016 | Wilson | ................ | A23N 12/125 426/233 |
| 2016/0198885 A1 * | 7/2016 | Logan | ................ | A47J 36/00 99/325 |
| 2016/0295906 A1 * | 10/2016 | Jacobsen | ................ | A23L 5/34 |
| 2017/0055542 A1 * | 3/2017 | Cameron | ................ | A23F 5/46 |
| 2017/0215451 A1 * | 8/2017 | Tan | ................ | G01N 29/00 |
| 2017/0360242 A1 * | 12/2017 | Boggavarapu | ................ | A23N 12/125 |
| 2018/0343913 A1 * | 12/2018 | Tun | ................ | A23N 12/125 |

FOREIGN PATENT DOCUMENTS

| | | |
|---|---|---|
| JP | 6211223 B1 | 10/2017 |
| JP | 6261788 B1 | 1/2018 |
| KR | 20100038802 A | 4/2010 |
| KR | 20150131599 A | 11/2015 |
| TW | 201404315 A | 2/2014 |
| TW | I562735 B | 12/2016 |
| WO | 2015162021 A1 | 10/2015 |
| WO | 2016071165 A1 | 5/2016 |
| WO | 2017093929 A1 | 6/2017 |

OTHER PUBLICATIONS

Office Action to the corresponding European Patent Application rendered by the European Patent Office (EPO) dated Nov. 26, 2020, 5 pages.
Office Action to the corresponding China Patent Application rendered by the China National Intellectual Property Administration (CNIPA) dated Mar. 30, 2020, 17 pages (including English translation).
Office Action to the corresponding Japan Patent Application dated Nov. 12, 2019, 14 pages (including English translation).
The extended European Search Report rendered by the European Patent Office for European Patent Application No. 18202902.5, dated Apr. 1, 2019, 60 pages.
Office Action to the corresponding Taiwan Patent Application rendered by the Taiwan Intellectual Property Office (TIPO) dated Apr. 26, 2019, 15 pages (including English translation).

* cited by examiner

ASSISTING APPARATUS FOR BEAN ROASTING AND BEAN ROASTING APPARATUS

PRIORITY

This application claims the benefit of priority based on U.S. Provisional Application Ser. No. 62/587,448 filed on Nov. 16, 2017, which is hereby incorporated by reference in its entirety.

FIELD

The present invention relates to a bean roasting apparatus and an assisting apparatus for bean roasting. More particularly, the bean roasting apparatus and the assisting apparatus for bean roasting of the present invention can accurately determine the bean roasting stage and maintain the roasting quality.

BACKGROUND

Roasting technology of coffee beans is a technology that requires a lot of operational experience to be skilled. Depending on the different demands for the flavor of the coffee, the coffee beans need to be roasted to different stage. Currently, there are two main technical methods for determining the roasting stages of the coffee beans during the roasting of the coffee beans. The first method determines the roasting stages by observing the color of the coffee beans during the roasting of the coffee beans, and the second method determines the roasting stages by the sound generated during the roasting of the coffee beans.

Specifically, for the method of determining the roasting stages by the sound, the coffee beans will generate different sounds at different roasting stages (e.g., the start of the first crack, the intensive stage of the first crack, the end of the first crack, the start of the second crack, the intensive stage of the second crack, the end of the second crack or the like) when the coffee beans expand and crack upon being heated during the roasting process. A roaster may decide a time point to offload the beans, control the fire, and adjust the damper or the like according to the sounds generated at different roasting stages. However, the conventional method to determine the roasting stage of the coffee beans is to listen to the sound generated by the roasting device by the human ear (e.g., the roaster's ear). Therefore, with the different experience and status of the different roasters, this method will cause many uncertain factors. Moreover, without specific and standardized values as a reference, it is hard to precisely duplicate the same flavor in the roasting process even by a same professional roaster. Furthermore, this method requires the roaster to wait beside the roasting device for a long time in order not to miss the bean offloading time point, so this method is quite labor consuming.

Accordingly, an urgent need exists in the art to provide an assisting mechanism for bean roasting so as to precisely determine the bean roasting stages and maintain the roasting quality.

SUMMARY

An objective is to provide an assisting mechanism for bean roasting, which generates a control signal by sensing sound inside the chamber of a conventional bean roasting device or the bean roasting apparatus of the present invention and analyzing the sensed sound, and informs a roaster of the current roasting stage of the coffee beans in various prompting manners. Different from the conventional technology, the assisting mechanism for bean roasting of the present invention can precisely determine the roasting stages of the coffee beans without human intervention and reduce the influence of artificial interferences to assist the roaster in learning the roasting stage of the coffee beans in real time during the roasting process, and the roaster can receive the roasting information of the conventional bean roasting device or the bean roasting apparatus of the present invention without the need of waiting beside the bean roasting device for a long time. Moreover, the assisting mechanism for bean roasting of the present invention may further achieve automatic roasting and perform a bean offloading operation depending on the roasting stage set by the roaster.

Provided herein is an assisting apparatus for bean roasting which comprises a microphone and a processor. The microphone is configured to sense sound in a chamber of a bean roasting device to generate an audio signal. The processor is electrically connected to the microphone and is configured to receive the audio signal from the microphone and generate a control signal by determining that an energy value of the audio signal crosses a threshold at a time point based on an observation time window.

Also provided is a bean roasting apparatus which comprises a chamber, a microphone and a processor. The microphone is configured to sense sound in the chamber to generate an audio signal. The processor is electrically connected to the microphone, and is configured to receive the audio signal from the microphone and generate a control signal by determining that an energy value of the audio signal crosses a threshold at a time point based on an observation time window.

The detailed technology and preferred embodiments implemented for the present invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the scope of the present invention. It shall be appreciated that, in the following embodiments and the attached drawings, elements unrelated to the present invention are omitted from depiction.

Figure 1:
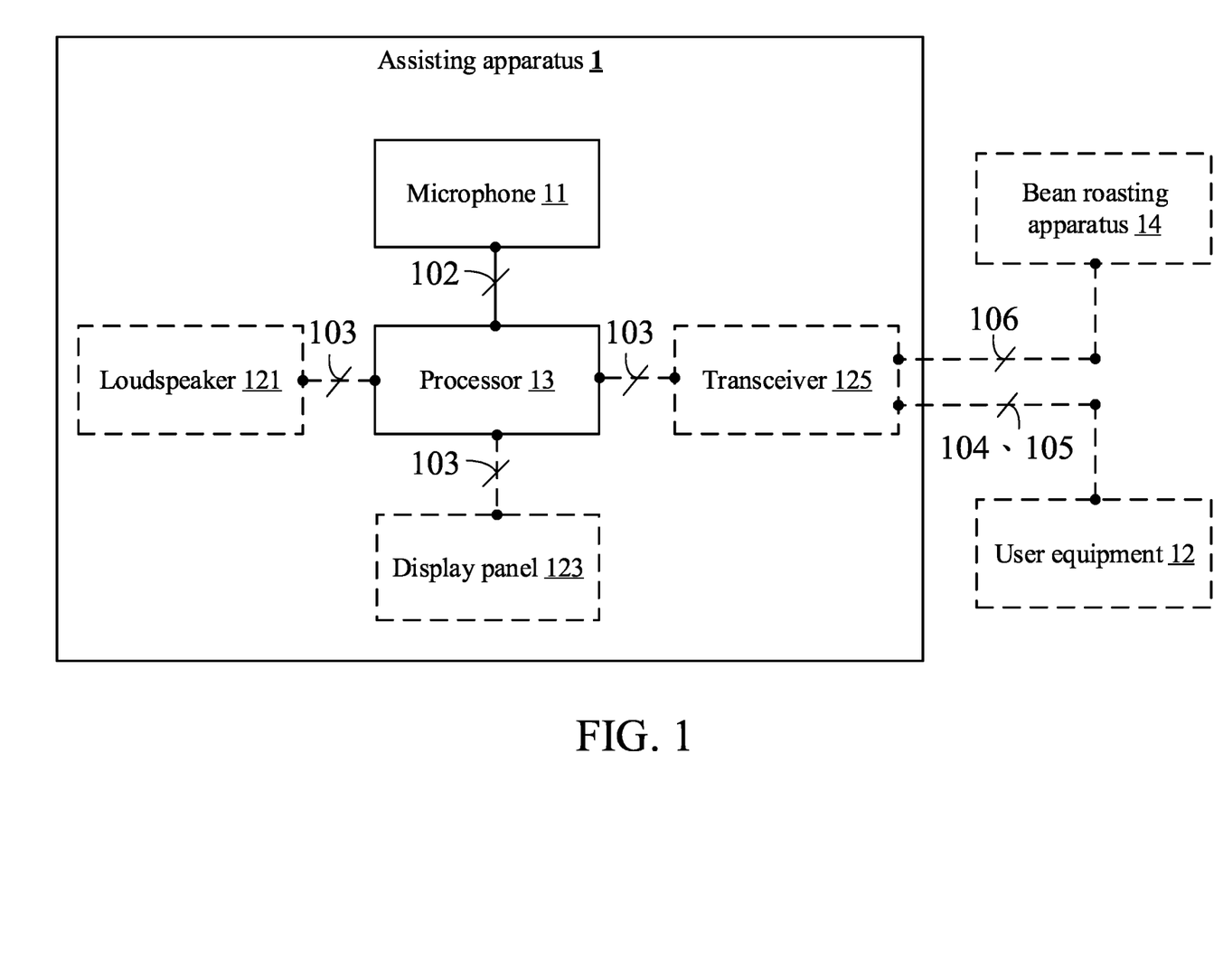
FIG. 1 depicts a schematic view of an assisting apparatus 1 for bean roasting according to the present invention.

FIG. 1 is a schematic view of an assisting apparatus 1 for bean roasting according to a first embodiment of the present invention. The assisting apparatus 1 for bean roasting comprises a microphone 11 and a processor 13. The processor 13 is electrically connected to the microphone 11. The microphone 11 may be any audio receiving device of the same function. The assisting apparatus 1 for bean roasting is disposed adjacent to a bean roasting device (e.g., disposed at a side or at the top or bottom of a chamber of the bean roasting device) to sense sound inside the chamber during the bean roasting process (i.e., the sound generated during the roasting process of coffee beans).

Figure 2:
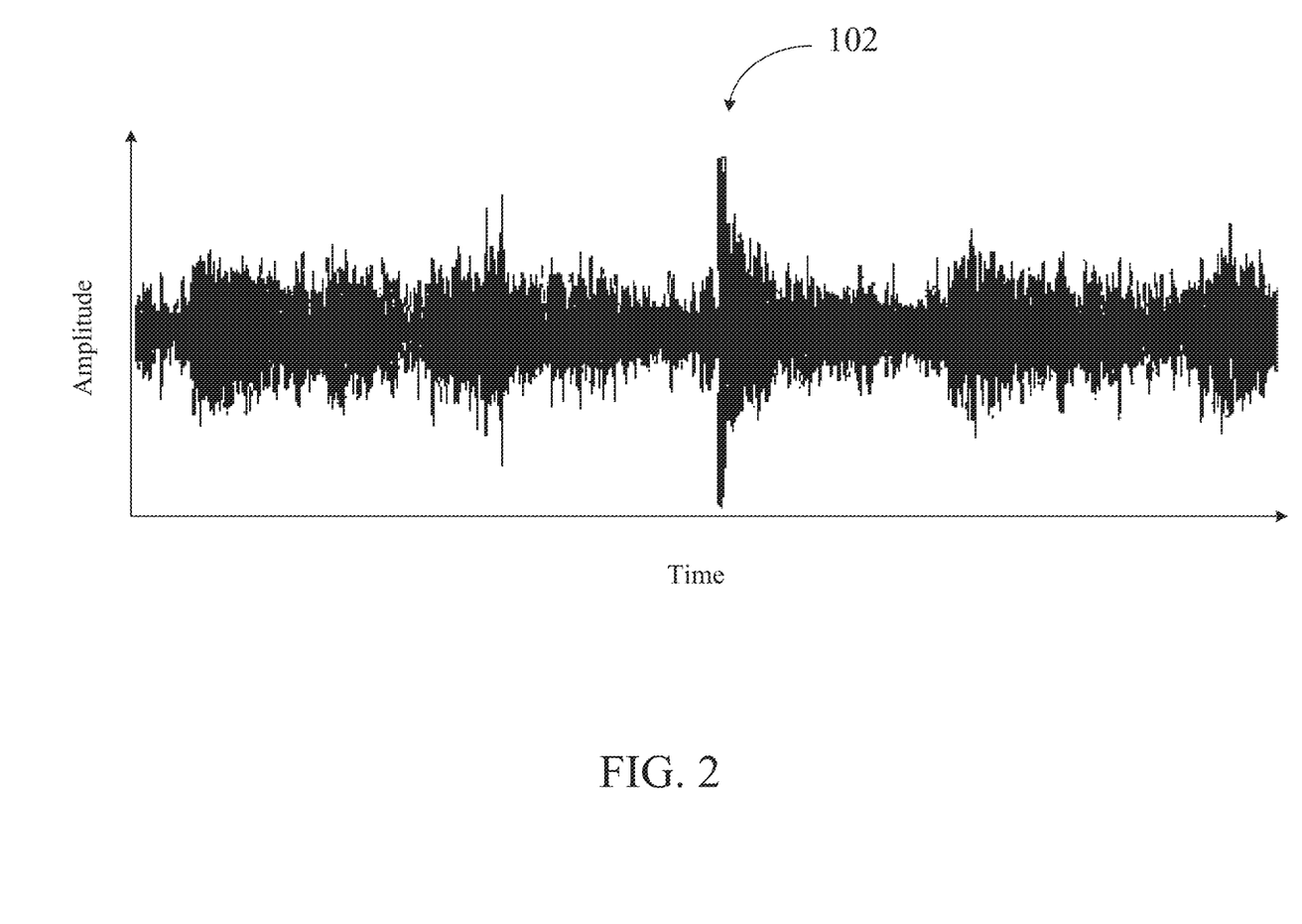
FIG. 2 depicts a schematic view of an audio signal 102 according to the present invention.
Figure 3:
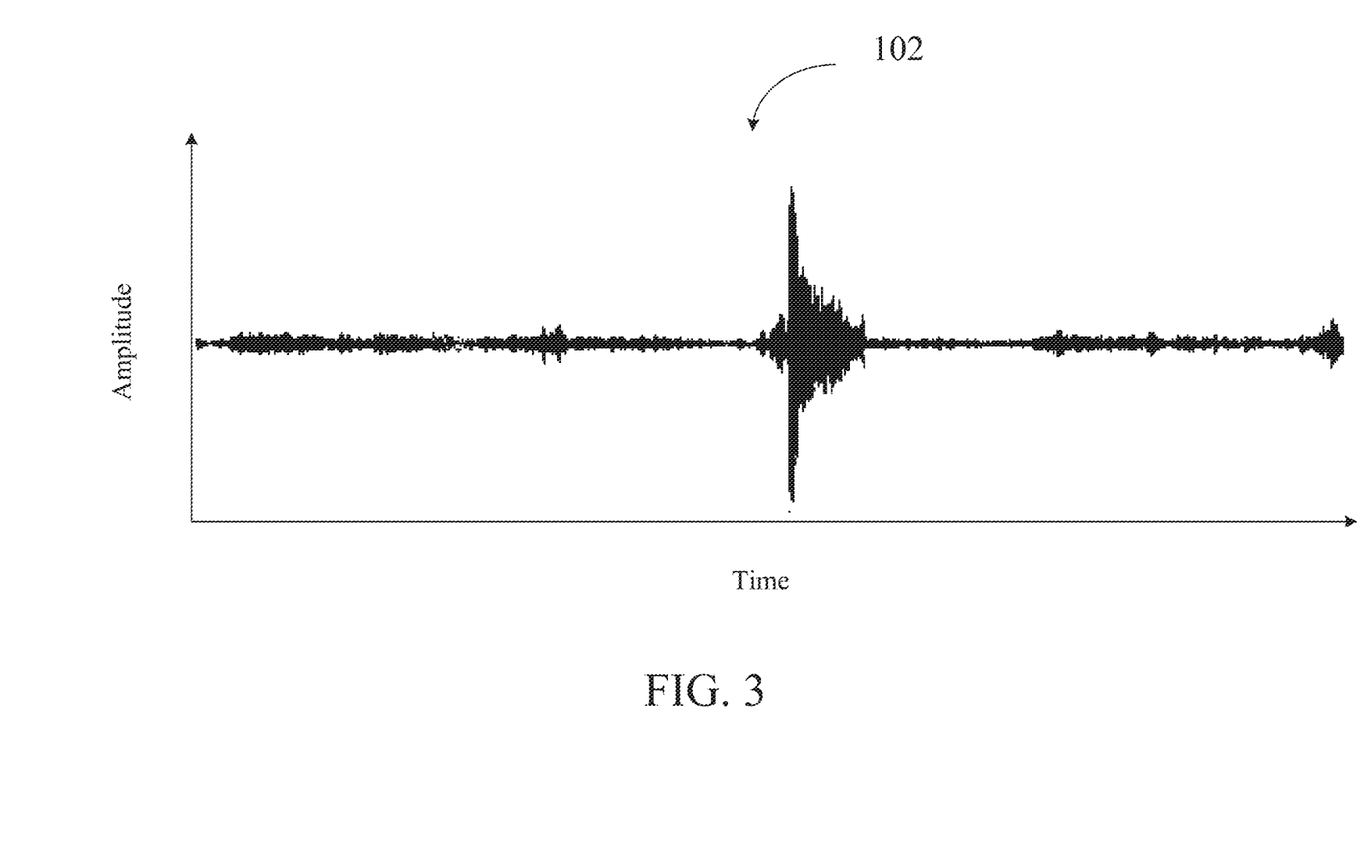
FIG. 3 depicts a schematic view of the audio signal 102 after the noise reduction according to the present invention.

In this embodiment, the microphone 11 continuously senses sound and transforms the sound sensed from an analog signal into a digital signal according to a sample rate so as to generate an audio signal 102. For example, as shown in FIG. 2, the audio signal 102 may be represented in a time domain, wherein the horizontal axis is time and the vertical axis is amplitude. Moreover, in some embodiments, the microphone 11 may further comprise a high pass filter, which first performs noise reduction on the analog signal generated after sensing the sound to filter unnecessary interference noise in the environment, and then transforms the analog signal into a digital signal to generate the audio signal 102, as shown in FIG. 3.

However, as shall be appreciated by those of ordinary skill in the art, the aforesaid noise reduction may also be implemented by the processor 13 via software. For example, after receiving the audio signal 102 on which the noise reduction has not been performed, the processor 13 may first have the audio signal 102 pass through a high pass filter, which may be represented as follows if it is expressed by a frequency domain equation:

$$H(z)=1-a*z^{-1}$$

wherein H(z) is a filtering function, z is a discrete point on the frequency domain, and a ranges from 0.9 to 1. Moreover, if the high pass filter is expressed by a time domain equation, then the high pass filter may be represented as follows:

$$s'(n)=s(n)-a*s(n-1)$$

wherein s'(n) is a discrete value on the time domain after the filtering, s(n) is a discrete value on the time domain before the filtering, n is a discrete point on the time domain, and a ranges from 0.9 to 1.

Accordingly, no matter the noise reduction is achieved via hardware or software, the processor 13 can obtain the audio signal 102 as shown in FIG. 3. Next, the processor 13 analyzes the audio signal 102 based on an observation time window. It shall be appreciated that, the observation time window is an observation time unit that is used to retrieve N sample values of the audio signal 102 on different time segments, wherein the number of N may be 256 or 512, and the time covered by each observation time window is about 20 milliseconds (ms) to 30 ms. In other words, the observation time window retrieves values of different time segments of the audio signal 102 as time goes by. In the present invention, each time segment retrieved from the audio signal 102 is called an audio frame.

Figure 4A:
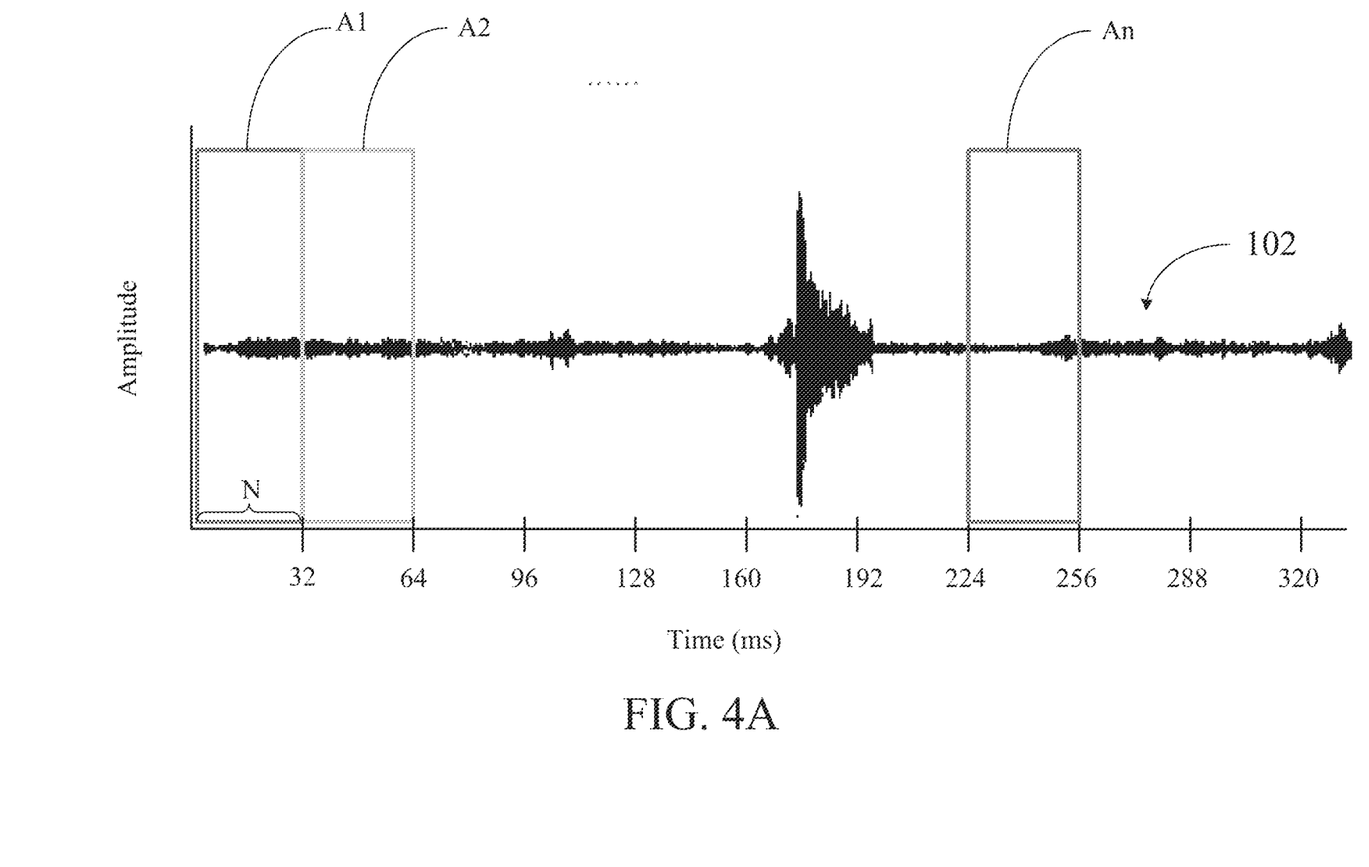
FIG. 4A depicts a schematic view of the observation time windows at different time points according to the present invention.

For example, as shown in FIG. 4A, audio frames A1, A2, ..., An comprise values of different time segments of the audio signal 102 that are retrieved in sequence on the timeline based on the observation time window. It is assumed that the sample rate of the audio signal 102 is 8 kilohertz (KHz), and the audio frames A1, A2, ..., An respectively consist of 256 sample points, then the time length corresponding to each audio frame is 32 ms, i.e., (256*1000)/8000. Therefore, taking the audio frame A1 and the audio frame A2 as an example for illustration, in the case where adjacent audio frames are not overlapped with each other, the audio frame A1 comprises values of the audio signal 102 between 0 ms and 31 ms, and the audio frame A2 comprises values of the audio signal 102 between 32 ms and 63 ms.

Figure 4B:
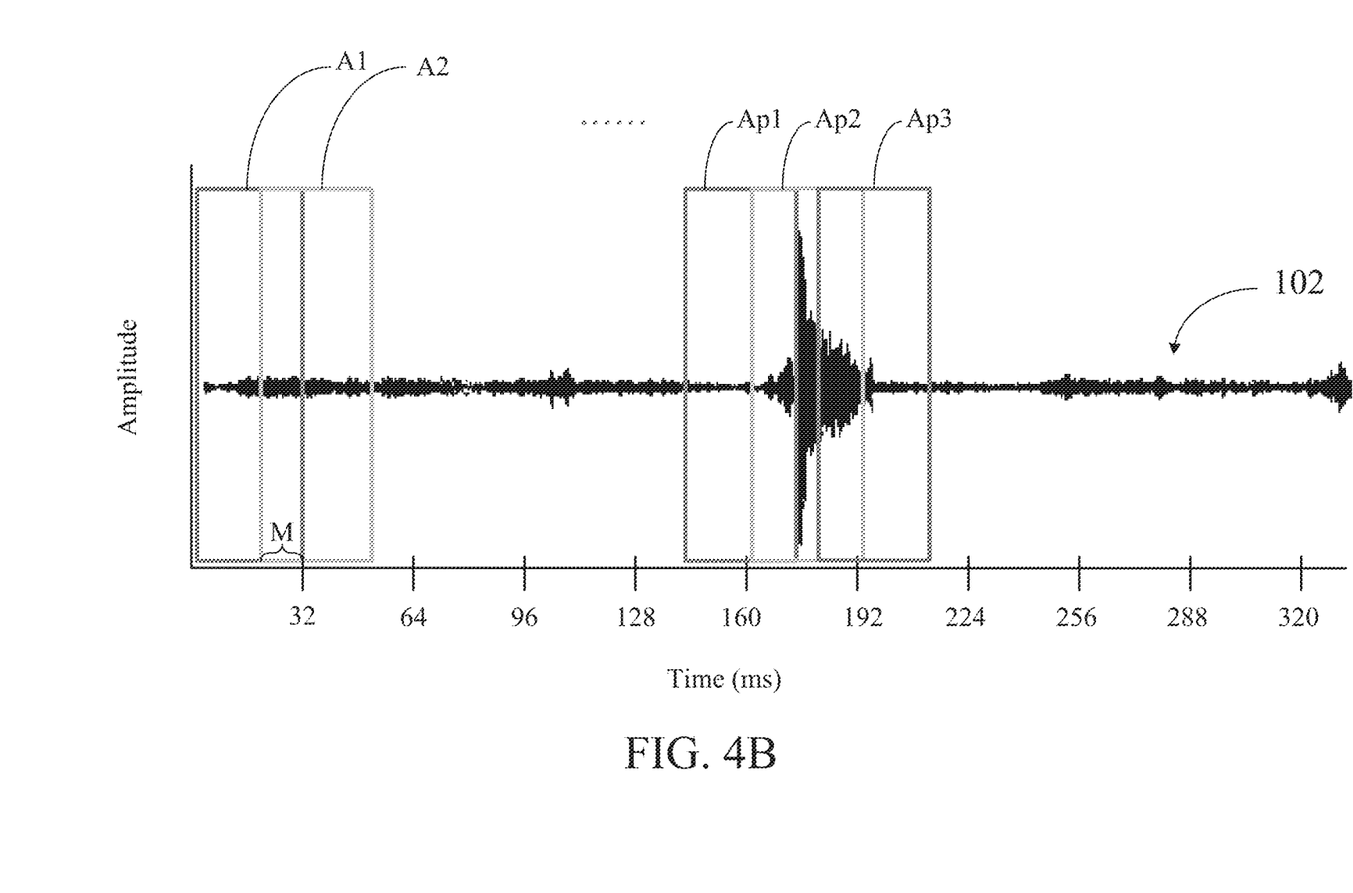
FIG. 4B depicts another schematic view of the observation time windows at different time points according to the present invention.

However, in order to prevent the accuracy of determining the change in the audio signal 102 by the processor 13 from decreasing due to an excessive change between two adjacent audio frames, a partially overlapped area may exist between the adjacent audio frames (e.g., the overlapped area comprises M sample points), as shown in FIG. 4B. For the case where the sample rate of audio used for general voice identification is about 8 KHz or 16 KHz, the value of N is generally set to be 256 or 512, the time covered by each observation time window is about 20 ms to 30 ms, and the value of M is usually set to be ½ or ⅓ of N.

Thereafter, according to the observation time window of each time point, the processor 13 determines an energy value (e.g., a value of the total amplitude) of the audio signal 102 within the observation time window. In other words, for the energy value of each of the audio frames, the processor 13 retrieves the audio signal 102 within the observation time window as a to-be-analyzed signal to calculate a total signal energy value of the to-be-analyzed signal in a time domain and takes the total signal energy value as the energy value of the audio frame. Thereafter, when the processor 13 determines that the energy value of an audio frame crosses a threshold, the processor 13 generates a control signal 103 to indicate a specific time point (e.g., one of a crack start time point and a crack end time point) corresponding to the audio frame.

For example, as shown in FIG. 4B, when the processor 13 calculates the energy value in each frame sequentially and determines that the energy value in an audio frame Ap1 exceeds a first threshold for the first time, the processor 13 generates a corresponding control signal which indicates the start of the first crack. After the start of the first crack, the total energy of the subsequent audio frames increases gradually, and when the processor 13 determines that the total amplitude energy in an audio frame Ap2 exceeds a second threshold for the first time, the processor 13 generates a corresponding control signal which indicates an intensive stage of the first crack. Next, after the intensive stage of the first crack, the total energy of the subsequent audio frames decreases gradually, and when the processor 13 determines that the total amplitude energy in an audio frame Ap3 is below a third threshold, the processor 13 generates a corresponding control signal which indicates the end of the first crack.

Moreover, if the coffee beans are still roasted continuously after the end of the first crack, then the total energy of the subsequent audio frames will again increase gradually when the coffee beans is close to the stage of second crack. Therefore, the processor 13 may determine the time points of the start of the second crack, the intensive stage of the second crack and the end of the second crack based on the aforesaid manner of determining the time points of the start of the first crack, the intensive stage of the first crack and the end of the first crack. Since people skilled in the art shall appreciate how to determine the time points of the start of the second crack, the intensive stage of the second crack and the end of the second crack based on the above description of determining the time points of the start of the first crack, the intensive stage of the first crack and the end of the first crack, and thus this will not be further described herein. Moreover, as shall be appreciated by those of ordinary skill in the art, the aforesaid second threshold is certainly greater than the first threshold and the third threshold, and the third threshold may be set to be the same as the first threshold depending on the actual design. Furthermore, the present invention may not need to set a threshold (i.e., the second threshold) for the intensive stage of the first crack, and instead infer the time point of the intensive stage of the first crack according to the time points of the start of the first crack and the intensive stage of the first crack that are determined previously.

Moreover, in an embodiment, the assisting apparatus 1 for bean roasting may further comprise a loudspeaker 121 electrically connected to the processor 13, and the processor 13 may transmit the generated control signal 103 to the loudspeaker 121 so that the loudspeaker 121 generates a prompting signal. In this way, as the assisting apparatus 1 for bean roasting determines the roasting stages (i.e., the start of the first crack, the intensive stage of the first crack, the end of the first crack, the start of the second crack, the intensive stage of the second crack, the end of the second crack or the like), the user may decide the time point to offload the beans according to the prompting signal.

Furthermore, in an embodiment, the assisting apparatus 1 for bean roasting further comprises a display panel 123 electrically connected to the processor 13, and the processor 13 may transmit the generated control signal 103 to the display panel 123 so that the display panel 123 displays a prompting picture. In this way, as the assisting apparatus 1 for bean roasting determines the roasting stages, the user may decide the time point to offload the beans according to the prompting picture.

Additionally, in an embodiment, the assisting apparatus 1 for bean roasting may further comprise a transceiver 125 electrically connected to the processor 13, and the processor 13 may transmit the generated control signal 103 to the transceiver 125 so that the transceiver 125 transmits a prompting message 104 to a user equipment 12 according to the received control signal 103. For example, the user equipment 12 may be a smartphone, and the manufacture of the assisting apparatus 1 for bean roasting may design an application that can be installed on the smartphone. Therefore, after the application is installed on the smartphone of the user, the smartphone may be connected to the assisting apparatus 1 for bean roasting directly (via wireless technology) or indirectly (via local area network or Internet or the like), and thus the smartphone can receive the prompting message 104 from the assisting apparatus 1 for bean roasting. In this way, as the assisting apparatus 1 for bean roasting determines the roasting stages, the user may be informed of the roasting stages immediately and decide the time point to offload the beans.

Moreover, in an embodiment, the assisting apparatus 1 for bean roasting may further comprise a transceiver 125 electrically connected to the processor 13, and the processor 13 may transmit the generated control signal 103 to the transceiver 125 so that the transceiver 125 further transmits another control signal 106 to the bean roasting apparatus 14 to enable the bean roasting apparatus 14 to automatically perform an operation (e.g., a bean offloading operation). For example, the user equipment 12 may set the assisting apparatus 1 for bean roasting to generate a control signal 103 after it is determined that the first crack ends so that the bean roasting apparatus 14 automatically performs the bean offloading operation.

Figure 5A:
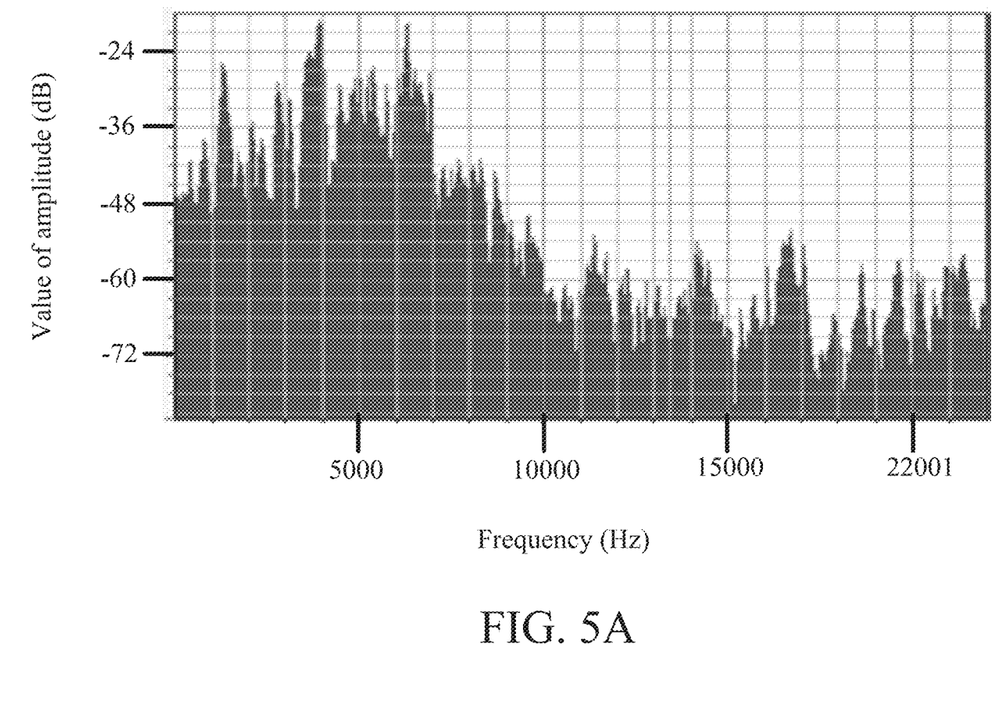
FIG. 5A depicts a spectrogram corresponding to a time frame within the interval from the start of the first crack to the intensive stage of the first crack of coffee beans.
Figure 5B:
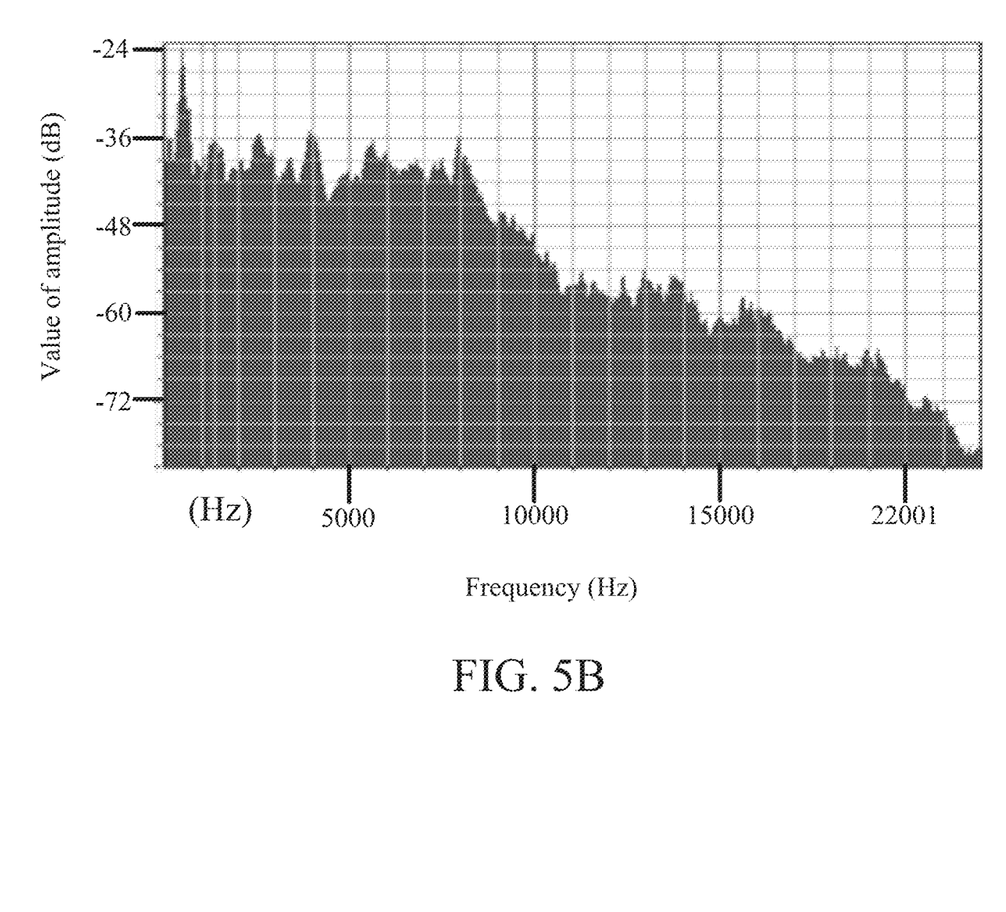
FIG. 5B depicts a spectrogram of an environment audio frequency signal.
Figure 5C:
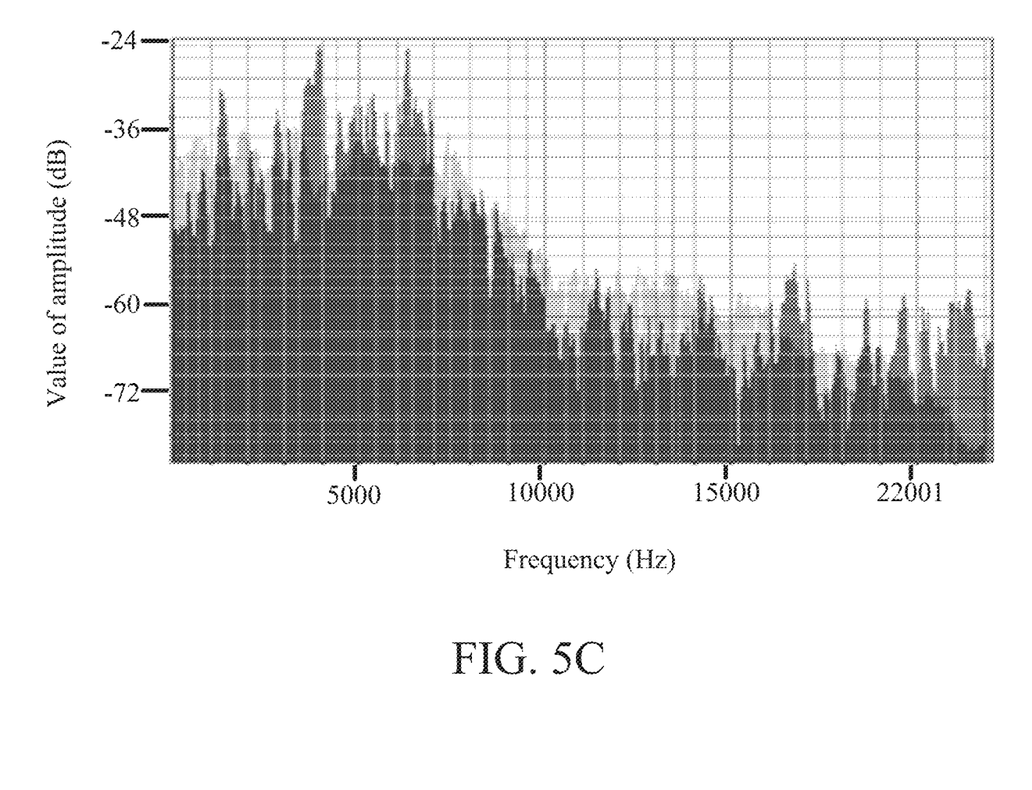
FIG. 5C depicts an overlapped spectrogram between FIG. 5A and FIG. 5B.

Please further refer to FIG. 5A to FIG. 5C for a second embodiment of the present invention. Different from the first embodiment, the processor 13 in this embodiment transforms the audio signal 102 in each audio frame from the time domain to the frequency domain and analyzes the energy value of each audio frame in the frequency domain.

Specifically, the processor 13 further retrieves the audio signal 102 within the observation time window as a to-be-analyzed signal and transforms the to-be-analyzed signal into a frequency-domain signal to calculate a total signal energy value of the frequency-domain signal in a particular frequency band. In other words, the processor 13 performs Fast Fourier Transform (FFT) operation on each audio frame to transform the audio frame into a frequency-domain signal, and calculates a total signal energy value of the frequency-domain signal in a particular frequency band and takes the total signal energy value as the energy value of the frame.

For example, FIG. 5A depicts a spectrogram of transforming the audio signal 102 within an audio frame into a frequency-domain signal of the frequency domain, wherein the horizontal axis is frequency (unit: hertz (Hz)) and the vertical axis is the value of amplitude (unit: decibel (dB)). The processor 13 may calculate a total signal energy value of the frequency-domain signal within a particular frequency band (e.g., from 5 KHz to 10 KHz), and take the total signal energy value as an energy value of the audio frame. Therefore, the processor 13 calculates the total signal energy value of each audio frame in a particular frequency band, compares the energy value with a threshold, and generates a control signal 103 when the energy value crosses a threshold. Based on the aforesaid first embodiment, people skilled in the art shall appreciate how to determine the time points of the roasting stages by setting thresholds corresponding to the roasting stages based on the energy value obtained by calculating the frequency-domain signal, and thus will not be further described herein.

The following will describe how to determine the particular frequency band and the threshold in the present invention. First, the processor 13 takes an audio signal that is sensed and generated by the microphone 11 at an initial bean roasting stage (the stage at the beginning of bean roasting) as an environment audio signal, and transforms an audio frame during this stage to the frequency domain to obtain an environment audio frequency signal, and a spectrogram thereof is as shown in FIG. 5B. Next, a spectrogram (e.g., FIG. 5A) corresponding to a time frame within the interval from the start of the first crack to the intensive stage of the first crack of coffee beans is overlaid with a spectrogram of FIG. 5B to generate an overlaid spectrogram as shown in FIG. 5C. In FIG. 5C, the dark grey part corresponds to the spectrogram (i.e., FIG. 5A) of an audio frequency signal within the interval from the start of the first crack to the intensive stage of the first crack, and the light grey part corresponds to the spectrogram (i.e., FIG. 5B) of the environment audio frequency signal, and the dark part is the overlapped part therebetween. According to FIG. 5C, the processor 13 may calculate differences in energy values between the audio frequency signal and the environment audio signal in different frequency bands (i.e., the dark grey part), determine the frequency band having the obvious energy difference (e.g., around 5 KHz), and accordingly set thresholds corresponding to different roasting stages.

The aforesaid process of determining the particular frequency band and the threshold may be implemented by labelling particular time points (e.g., the start of the first crack, the intensive stage of the first crack, the end of the first crack, the start of the second crack, the intensive stage of the second crack, the end of the second crack or the like) with user intervention and through machine learning so that the processor 13 may identify the frequency band having the obvious energy difference more precisely and set thresholds corresponding to different roasting stages. For example, the assisting apparatus 1 for bean roasting may further comprise a transceiver 125 electrically connected to the processor 13, and the processor 13 may receive a feedback signal 105 from the user equipment 12 via the transceiver 125 to adjust the particular frequency band for calculating the energy value and the threshold.

Moreover, in an embodiment, the processor 13 may first multiply each audio frame with a Hamming Window before performing the Fast Fourier Transform (FFT) operation on the audio signal 102 in each audio frame, so as to increase the continuity of a left-end signal and a right-end signal of each audio frame. Thereafter, the processor 13 performs the Fast Fourier Transform (FFT) operation on the audio signal 102 of each audio frame multiplied with the Hamming Window. The Hamming Window is well known to those of ordinary skill in the art, and thus will not be further described herein.

Through the assisting apparatus 1 for bean roasting of the present invention, the user may record information about the time points of the roasting stages (e.g., the start of the first crack, the intensive stage of the first crack, the end of the first crack, the start of the second crack, the intensive stage of the second crack, and the end of the second crack or the like) according to the control signals and perform suitable operations (e.g., opening the fire damper, adjusting the temperature, turning off the fire, and performing the bean offloading operation or the like) in real time according to the information. Moreover, the user may further plot roasting curve graphs of various kinds of coffee beans according to the information and user feedback information to record information relevant to bean roasting (e.g., the bean roasting time, temperature and roasting stage or the like) as auxiliary reference for the next bean roasting. Thus, automatic roasting processes for different kinds of coffee beans can be designed according to the information and shared with other users via a cloud database as a reference.

As shall be known from the above descriptions, the assisting apparatus 1 for bean roasting of the present invention generates a control signal 103 by sensing the sound inside the chamber of the bean roasting device and analyzing the sensed sound, and informs a roaster of the current roasting stage of the coffee beans in various prompting manners. Different from the conventional technology, the assisting apparatus 1 for bean roasting can precisely determine the roasting stage of the coffee beans without human intervention and reduce the influence of artificial interferences to assist the roaster in learning the roasting stage of the coffee beans in real time during the roasting process, and the roaster can receive the roasting information of the bean roasting device without the need of waiting beside the bean roasting device for a long time. Moreover, the assisting apparatus 1 for bean roasting of the present invention may further achieve automatic roasting and perform the bean offloading operation depending on the roasting stage set by the roaster.

Figure 6:
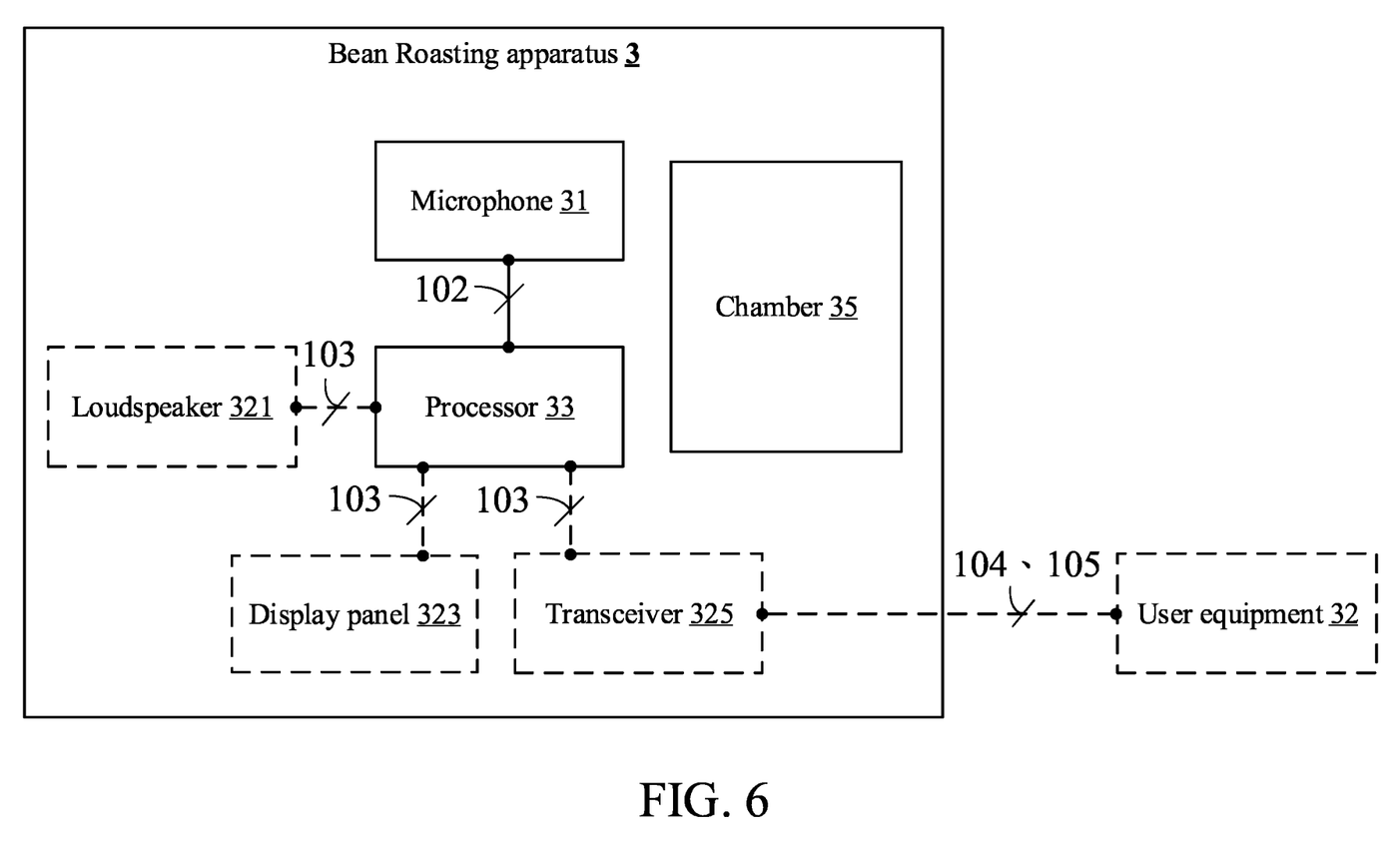
FIG. 6 depicts a schematic view of a bean roasting apparatus 3 according to the present invention.

A third embodiment of the present invention is a bean roasting apparatus as shown in FIG. 6. Different from the first embodiment, the assisting apparatus 1 for bean roasting of the first embodiment is integrated into a bean roasting apparatus 3 in third embodiment. Specifically, the bean roasting apparatus 3 comprises a microphone 31, a processor 33 and a chamber 35, and the processor 33 is electrically connected to the microphone 31.

Similarly, the microphone 31 senses sound inside the chamber 35 to generate the audio signal 102. After receiving the audio signal 102 from the microphone 31, the processor 33 determines that an energy value of the audio signal crosses a threshold at a time point based on an observation time window to generate a control signal 103. Similarly, the microphone 31 may further comprise a high pass filter, which first performs noise reduction on the analog signal generated after sensing the sound to filter unnecessary interference noise in the environment, and then transforms the analog signal into a digital signal to generate the audio signal 102. Moreover, the noise reduction may also be achieved by the processor 33 through software.

In an embodiment, the bean roasting apparatus 3 may further comprise a loudspeaker 321 electrically connected to the processor 33, and the processor 33 may transmit the generated control signal 103 to the loudspeaker 321 so that the loudspeaker 321 generates a prompting signal. In this way, as the bean roasting apparatus 3 determines the roasting stages (i.e., the start of the first crack, the intensive stage of the first crack, the end of the first crack, the start of the second crack, the intensive stage of the second crack, the end of the second crack or the like), the user may decide the time point to offload the beans according to the prompting signal.

Furthermore, in an embodiment, the bean roasting apparatus 3 further comprises a display panel 323 electrically connected to the processor 33, and the processor 33 may transmit the generated control signal 103 to the display panel 323 so that the display panel 323 displays a prompting picture. In this way, as the bean roasting apparatus 3 determines the roasting stages, the user may decide the time point to offload the beans according to the prompting picture.

In an embodiment, the bean roasting apparatus 3 may further comprise a transceiver 325 electrically connected to the processor, and the processor 33 transmits the generated control signal 103 to the transceiver 325 so that the transceiver 325 transmits a prompting message 104 to a user equipment 32 according to the received control signal 103. In this way, as the bean roasting apparatus 3 for bean roasting determines the roasting stages, the user may be informed of the roasting stages immediately and decide the time point to offload the beans.

In an embodiment, the processor 33 retrieves the audio signal 102 within the observation time window as a to-be-analyzed signal to calculate a total signal energy value of the to-be-analyzed signal in a time domain. Therefore, the processor 33 takes the total signal energy value as the energy value of the audio signal that is retrieved based on the observation time window.

In an embodiment, the processor 33 retrieves the audio signal within the observation time window as a to-be-analyzed signal and transforms the to-be-analyzed signal into a frequency-domain signal to calculate a total signal energy value of the frequency-domain signal in a particular frequency band. Therefore, the processor 33 takes the total signal energy value as the energy value of the audio signal that is retrieved based on the observation time window.

In other embodiments, the bean roasting apparatus 3 further comprises a discharge port and a discharge port control element. The discharge port control element is electrically connected to the processor 33. The processor 33 further transmits the control signal 103 to the discharge port control element so that the discharge port control element opens the discharge port to discharge a plurality of coffee beans within the chamber 35.

In addition to the aforesaid operations, the processor 33 of this embodiment can also execute all the operations and have all the corresponding functions of the processor 13 described in the aforesaid embodiment. How this embodiment executes these operations and has these functions will be readily appreciated by those of ordinary skill in the art based on the explanation of the aforesaid embodiment, and thus will not be further described herein.

According to the above descriptions, the present invention provides an assisting mechanism for bean roasting, which generates a control signal 103 by sensing the sound inside the chamber of the bean roasting apparatus and analyzing the sound, and informs a roaster of the current roasting stage of the coffee beans in various prompting manners. Different from the conventional technology, the assisting mechanism for bean roasting of the present invention can precisely determine the roasting stage of the coffee beans without human intervention and reduce the influence of artificial interferences to assist the roaster in learning the roasting stage of the coffee beans in real time during the roasting process, and the roaster can receive the roasting information of the bean roasting apparatus without the need of waiting beside the bean roasting apparatus for a long time. Moreover, the assisting mechanism for bean roasting of the present invention may further achieve automatic roasting and perform the bean offloading operation depending on the roasting stage set by the roaster.

The above invention is related to the detailed technical contents and inventive features thereof. People skilled in this field may proceed with a variety of modifications and replacements based on the inventions and suggestions of the invention as described without departing from the characteristics thereof. Nevertheless, although such modifications and replacements are not fully disclosed in the above descriptions, they have substantially been covered in the following claims as appended.

What is claimed is:

1. An assisting apparatus for bean roasting, comprising:
a microphone, being configured to sense sound in a chamber of a bean roasting device to generate an audio signal; and
a processor, being electrically connected to the microphone, and being configured to:
receive the audio signal from the microphone;
retrieve the audio signal within an observation time window as a to-be-analyzed signal;
determine a total signal energy value of the to-be-analyzed signal; and
generate a control signal when determining that the total energy value of the to-be-analyzed signal within the observation time window crosses a threshold at a time point, wherein the control signal indicates the time point representing one of a crack start time point, an intensive stage of cracking, and a crack end time point.

2. The assisting apparatus of claim 1, further comprising a loudspeaker electrically connected to the processor, wherein the processor further transmits the control signal to the loudspeaker to make the loudspeaker generate a prompting signal.

3. The assisting apparatus of claim 1, further comprising a display panel electrically connected to the processor, wherein the processor further transmits the control signal to the display panel to make the display panel display a prompting picture.

4. The assisting apparatus of claim 1, further comprising a transceiver electrically connected to the processor, wherein the processor further transmits the control signal to the transceiver to make the transceiver transmit a prompting message to a user equipment.

5. The assisting apparatus of claim 1, further comprising a transceiver electrically connected to the processor, wherein the processor further receives a feedback signal from a user equipment via the transceiver to adjust the threshold.

6. The assisting apparatus of claim 1, wherein the processor calculates the total signal energy value of the to-be-analyzed signal on a particular frequency band.

7. The assisting apparatus of claim 1, wherein the processor further performs a noise reduction on the audio signal.

8. A bean roasting apparatus, comprising:
a chamber;
a microphone, being configured to sense sound in the chamber to generate an audio signal; and
a processor, being electrically connected to the microphone, and being configured to:
receive the audio signal from the microphone;
retrieve the audio signal within an observation time window as a to-be-analyzed signal;
determine a total signal energy value of the to-be-analyzed signal; and
generate a control signal when determining that the total energy value of the to-be-analyzed signal within the observation time window crosses a threshold at a time point based on an observation time window, wherein the control signal indicates the time point representing one of a crack start time point, an intensive stage of cracking, and a crack end time point.

9. The bean roasting apparatus of claim 8, further comprising a loudspeaker electrically connected to the processor, wherein the processor further transmits the control signal to the loudspeaker to make the loudspeaker generate a prompting signal.

10. The bean roasting apparatus of claim 8, further comprising a display panel electrically connected to the processor, wherein the processor further transmits the control signal to the display panel to make the display panel display a prompting picture.

11. The bean roasting apparatus of claim 8, further comprising a transceiver electrically connected to the processor, wherein the processor further transmits the control signal to the transceiver to make the transceiver transmit a prompting message to a user equipment.

12. The bean roasting apparatus of claim 8, further comprising a transceiver electrically connected to the processor, wherein the processor further receives a feedback signal from a user equipment via the transceiver to adjust the threshold.

13. The bean roasting apparatus of claim 8, wherein the processor further calculates the total signal energy value of the to-be-analyzed signal on a particular frequency band.

14. The bean roasting apparatus of claim 8, wherein the processor further performs noise reduction on the audio signal.

15. The assisting apparatus of claim 1, further comprising a transceiver electrically connected to the processor, wherein the processor further transmits the control signal to the transceiver to make the transceiver transmits another control signal to the bean roasting device to enable the bean roasting device to perform a bean offloading operation.

16. The bean roasting apparatus of claim 8, further comprising a discharge port and a discharge port control element, wherein the discharge port control element is electrically connected to the processor and the processor further transmits the control signal to the discharge port control element to make the discharge port control element open the discharge port to discharge a plurality of coffee beans within the chamber.

* * * * *